United States Patent [19]

Dreher et al.

[11] Patent Number: 4,777,682

[45] Date of Patent: Oct. 18, 1988

[54] INTEGRAL WATER AND HEAT RECLAIM SYSTEM FOR A WASHING MACHINE

[75] Inventors: Adolph E. S. Dreher; Donald J. Edmundson, both of Wichita Falls, Tex.

[73] Assignee: Washex Machinery Corporation, Wichita Falls, Tex.

[21] Appl. No.: 41,714

[22] Filed: Apr. 23, 1987

[51] Int. Cl.$^4$ .................. D06F 33/02; D06F 39/08
[52] U.S. Cl. ................................. 8/158; 68/12 R; 68/16; 68/18 R; 68/207; 68/27
[58] Field of Search ................. 8/158; 68/12 R, 16, 68/18 R, 27, 207

[56] References Cited

U.S. PATENT DOCUMENTS

| 2,270,609 | 1/1942 | Smith | 68/18 R X |
| 3,600,911 | 8/1971 | McLagan | 68/27 X |
| 4,195,498 | 4/1980 | Pellerin | 68/3 R |

FOREIGN PATENT DOCUMENTS

| 824474 | 12/1959 | United Kingdom | 68/18 R |
| 886128 | 1/1962 | United Kingdom | 68/18 R |

Primary Examiner—Philip R. Coe
Attorney, Agent, or Firm—Hubbard, Thurman, Turner & Tucker

[57] ABSTRACT

An industrial laundry washer/extractor unit is provided with an integral water and heat reclaim system which includes a pair of water reclaim tanks supported in an elevated position on the unit's body section above the washing drum. A single pipe water transfer system is connected between the elevated tanks and the drum and has a pump operatively installed therein at or somewhat below the water operating level of the drum. The transfer system is controlled by a microprocessor to transfer used rinse water at different temperatures from the drum to the tanks and then re-transfer tank water to the drum for re-use as wash water in subsequent wash cycles of the unit. The temperatures of the reclaimed rinse water in the tanks closely match the wash temperatures in subsequent wash cycles so that a significant water heating cost savings is achieved together with reduced water and cleaning agent usage. Because the reclaim system is an integral part of the unit, and the tanks are supported in an elevated position, no additional floor space is required beyond that needed for the unit without the reclaim system.

18 Claims, 4 Drawing Sheets

INTEGRAL WATER AND HEAT RECLAIM SYSTEM FOR A WASHING MACHINE

BACKGROUND OF THE INVENTION

The present invention relates generally to washing machine apparatus, and more particularly provides a washing machine having integrally incorporated therein a unique water and heat reclaim system.

Commercial and industrial laundry facilities in, for example, hotels, industrial laundries and large hospitals, typically utilize one or more very large laundry washer-/extractor units to wash soiled linen. "Linen" is a generic laundry industry term encompassing a wide variety of launderable items such as sheets, pillow cases, table cloths, towels, uniforms and the like, whether such items are of an actual linen material or of another material such as cotton or polyester. Commercial/industrial washing machines of this general type occupy a considerable amount of floor space and use very large quantities of wash and rinse water, and concomitantly large amounts of energy to heat such water. A typical wash cycle comprises, in sequence, a pre-wash portion, a main wash portion, a first rinse portion, one or more subsequent rinse portions, and a final extraction portion, each of these cycle portions requires that heated water be supplied to, and then drained from, the washing machine drum or cylinder in which the linen disposed.

For many years it was conventional practice to supply fresh, heated water to the washing machine drum for each of the wash and rinse cycle portions, and then drain to waste the used, heated water from one wash or rinse cycle portion before initiating the next wash or rinse cycle portion. In this manner, each incoming quantity of fresh heated water was used only once in this "total water dump" operating format. And, of course, in each subsequent laundry cycle, the fresh heated water was again used only once before being drained to waste. This long-used process, in addition to under-utilizing vast quantities of water, also failed to utilize large amounts of residual heat carried away with the duct water flow.

With the escalation of both water and heating energy costs, it became quite desirable to at least to some extent reclaim water and/or heat therein from each wash cycle for use in subsequent cycles. One manner of at least partially achieving this goal has been to utilize a large, floor-mounted central water reclaim tank in conjunction with the washing machines located in the particular laundry facility. This large common tank is typically used to receive the final rinse cycle water from the individual washing machines and then to re-use the collected rinse water to fill the washing machine drums during their subsequent main or pre-wash cycle portions. In this manner, a considerable amount of water, and a portion of the residual heat therein, may be re-used to reduce both the water and energy costs of the commercial or industrial laundry operation.

This conventional scheme of recycling both water and heat, however, is subject to a variety of well known limitations and disadvantages. For example, as is well known, in most if not all commercial and industrial operations of any sort, floor space is at a premium. The large, floor-mounted common reclaim tank typically requires a considerable amount of such valuable floor space. Additionally, it is not always convenient to locate the large single reclaim tank closely adjacent the various washing machines in the laundry facility. Accordingly, it is often necessary to use a somewhat complex, and often lengthy, piping, valving and pumping system to operatively interconnect the various washing machines with the remote common reclaim tank. This, of course, adds to the overall installation cost of the laundry facility and can further result in the loss of considerable water heat as it traverses the lengthy piping system. Additionally, the use of a remote common reclaim tank also often requires that a separate drain system be built.

Another approach to the reclaim problem, which to some extent alleviates the space requirements of the central reclaim tank, is to flow the heated water being discharged from the washing machine drum through a heat exchanger which also has flowed therethrough incoming, fresh water being supplied to one or more of the washing machines. The water being drained from the washing machines is dumped to waste upon discharge thereof from the heat exchanger. It can be seen that this approach, while potentially alleviating the floor space problems associated with the central reclaim tank, addresses only the heat reclaim problem—it does not provide in any manner for the re-use of water. Additionally, it can readily be seen that an auxiliary control system is required to properly sequence the outflow of used water with the inflow of fresh supply water.

From the foregoing it can be seen that a definite need exists for various improvements in water and heat reclaim systems used in commercial an/or industrial laundry applications. It is accordingly an object of the present invention to provide such improvements.

SUMMARY OF THE INVENTION

In carrying out principles of the present invention, in accordance with a preferred embodiment thereof, improved washing machine apparatus is provided which has integrally incorporated therein a unique water and heat reclaim system. The washing machine has a floor mountable body section which carries a washing drum that is adapted to receive water, a suitable cleaning agent and launderable items, and is operable to wash, rinse and extract water from the items. Control means are provided to operate the washing machine in a "heavy soil" or a "light soil" wash cycle, in addition to other operating cycles such as textile dying, jean rinsing or the like. The light soil wash cycle includes, in sequence, a prewash portion, a main wash portion, a first rinse portion, a second rinse portion and a final extraction portion. The heavy soil wash cycle adds a third rinse portion and performs the pre-wash, main wash and second rinse portions with higher temperature water.

Supply and drain means are provided to respectively supply heated fresh water to the drum, and drain to waste water from within the drum, at appropriate points in the particular wash cycle selected. Auxiliary heating means are also provided for adding supplemental heat to water within the drum in the event that the temperature of such water is below that required in the particular wash cycle portion.

The reclaim system includes first and second water reclaim tanks which are supported on the body of the washing machine above the drum and are interconnected with the drum by transfer means which includes a single, two-way transfer pipe having a pump operatively installed therein at or somewhat below the operating water level of the drum.

At the end of the first and second rinse portions of a first light soil wash cycle, respectively, the control means automatically operate the transfer means to pump heated rinse water at a first temperature upwardly from the drum through the single transfer pipe into the first reclaim tank for storage therein, and pump heated rinse water at a second temperature upwardly from the drum through the single transfer pipe into the second reclaim tank for storage therein. During the next light soil wash cycle the control means automatically operate the transfer means to flow stored rinse water from the second reclaim tank downwardly through the single transfer pipe by gravity into the drum for use in the pre-wash portion of the wash cycle, and to flow stored rinse water from the first reclaim tank downwardly through the single transfer pipe by gravity into the drum for use in the main wash portion of the wash cycle.

When the machine is being operated in its heavy soil wash cycle, heated rinse water from the drum is additionally pumped into the first reclaim tank at the end of the third rinse portion of one wash cycle and then flowed downwardly into the drum for use in the first rinse portion of the next wash cycle.

In this manner, significant energy and water usage savings are uniquely achieved since reclaimed, heated rinse water from each preceding wash cycle is used as the wash water in each succeeding wash cycle. Because of the unique two-way transfer of heated drum water at two different temperatures, little if any auxiliary water heating of the re-used water is required. Additionally, appreciable cleaning agent usage savings are also achieved.

Because the reclaim is integrally incorporated into the washing machine, and the reclaim tanks are mounted on the machine in an elevated position, the reclaim system requires no additional space. The previous necessity of providing floor space and a complex piping system for a central, single temperature reclaim tank is thus uniquely eliminated. The simplicity of the single pipe transfer means further reduces the overall cost of the reclaim system.

DETAILED DESCRIPTION

Figure 1:
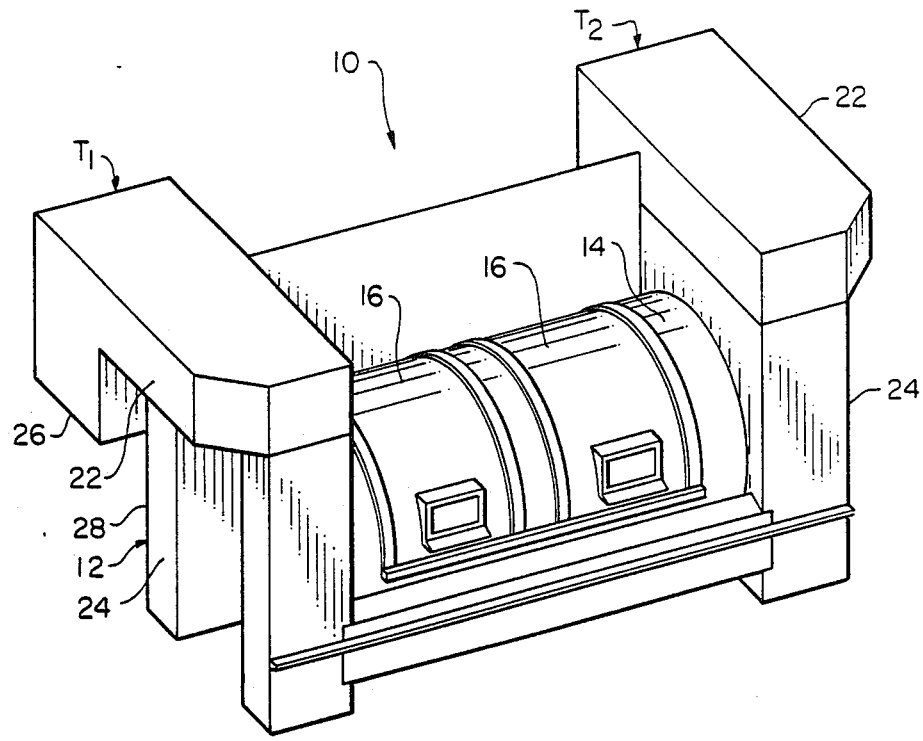
FIG. 1 is a perspective view of a commercial/industrial washing machine having integrally incorporated therein a water and heat reclaim system which embodies principles of the present invention.

Illustrated in FIG. 1 is a commercial washing machine 10 which embodies principles of the present invention and is used to wash a variety of launderable items (generically referred to in the laundry industry as "linen") such as sheets, pillow cases, table cloths, towels and uniforms for commercial and industrial operations such as hotels, factories and large hospitals. The washing machine 10 has a floor mountable main body section 12 which has an elongated, generally rectangular configuration. Carried by the body section 12, somewhat above its lower end, is a horizontally extending, elongated cylinder or drum 14 which is adapted to receive launderable items, water and a cleaning agent, and is operable in a generally conventional fashion to wash and rinse the launderable items which are loaded into the drum through a pair of suitable side access doors 16 therein.

Figure 3:
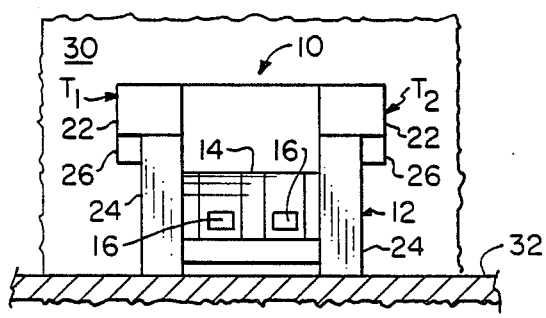
FIG. 3 is a front elevational view of one of the washing machines of FIG. 2.
Figure 4:
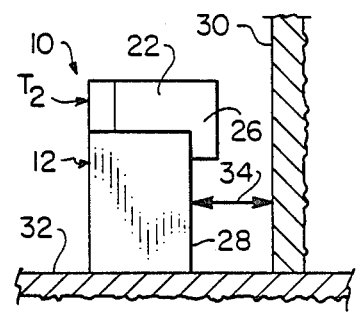
FIG. 4 is a right side elevational view of the washing machine of FIG. 3.

The washing machine 10 has integrally incorporated therein a unique water and heat reclaim system 20 (FIG. 5) that includes first and second water reclaim tanks $T_1$ and $T_2$ which are built into the body section 12 at its upper left and right corners, as viewed in FIG. 1, and are positioned above the drum 14. Each of the tanks $T_1$ and $T_2$ has a side portion 22 which extends horizontally beyond one of the opposite sides 24 of the body section 12 (see also FIGS. 2-4), and a rear portion 26 which extends downwardly along an upper portion of the back side 28 of the body section 12. It will be appreciated that reclaim tanks of other configurations could also be used if desired.

The balance of the reclaim system 20, which will be subsequently described in detail, is compactly housed within the body section 12. It can accordingly be seen at the outset that the water and heat reclaim system of the present invention does not require any additional space beyond that which would be required by the machine 10 without the system. The integral nature of the reclaim system 20 thus provides a significant advantage over conventional reclaim systems which utilize a large, single floor-mounted tank which must be provided with sometimes considerable floor space in addition to that required of the washing machines with which it is associated.

Figure 2:
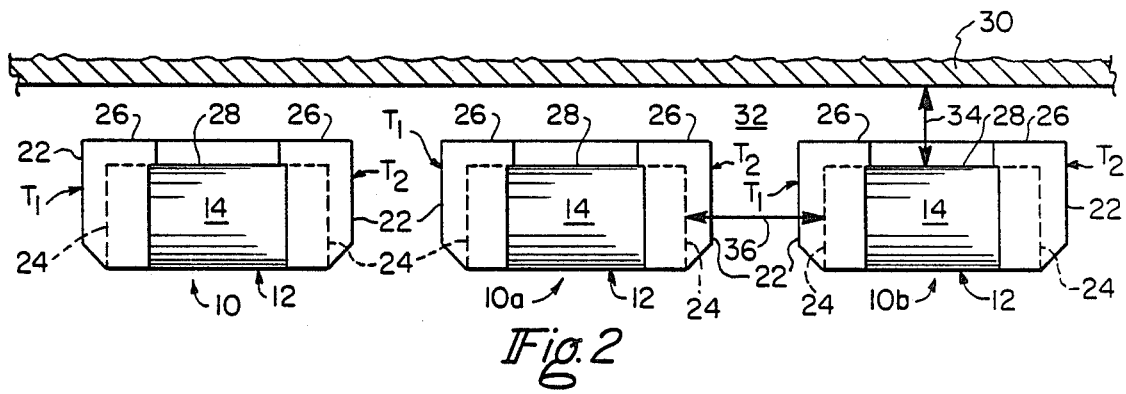
FIG. 2 is a reduced scale top plan view of three washing machines of the present invention.

This considerable space saving advantage is more clearly illustrated in FIG. 2 which is a simplified top plan view of three washing machines of the present invention—namely, machines 10, $10_a$ and $10_b$—which are positioned in a spaced, side-by-side relationship along a representative wall 30 and are supported on a floor 32. It is typically required that a minimum rear maintenance space 34 be maintained behind the body section 12, while a minimum side maintenance space 36 be maintained at each side of the body section. It can be seen in FIGS. 2-4 that the provision of the two integral reclaim tanks $T_1$ and $T_2$ permits these maintenance clearance spaces to be maintained so that the provision of such tanks does not require that the machines 10, $10_a$, $10_b$ be spaced further apart from each other, or from the wall 30, than would otherwise be required. Moreover, no additional floor space is required for reclaim tanks of any sort since the integral tanks $T_1$ and $T_2$ are held in an elevated orientation by the body sections 12. In short, the present invention provides a water and heat reclaim system that requires no floor space and in no way interferes with the ordinary spacing and positioning of the washing machines into which such reclaim system is incorporated.

Figure 5:
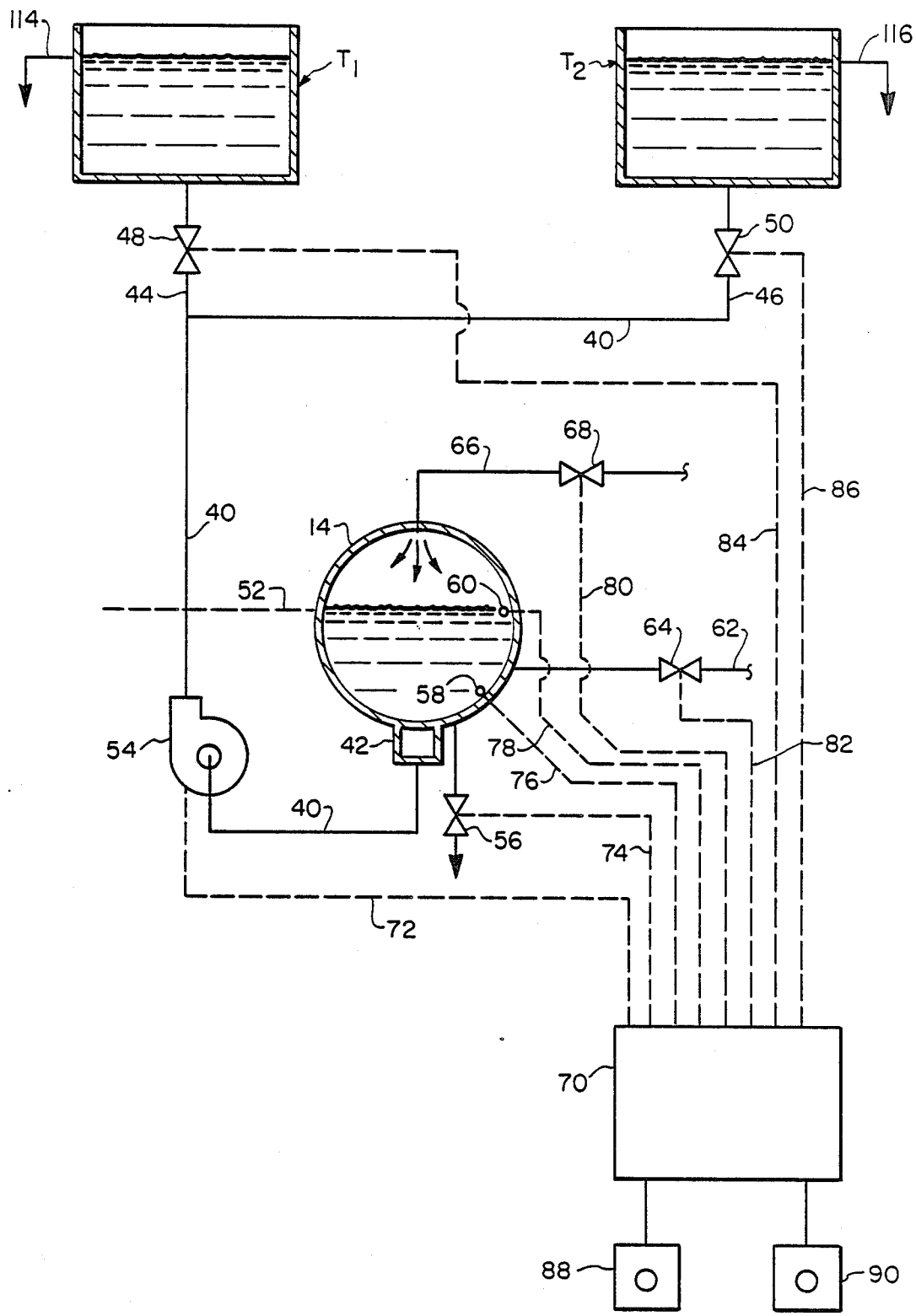
FIG. 5 is a schematic diagram illustrating the water and heat reclaim system.

As schematically depicted in FIG. 5, the water and heat reclaim system 20 includes a single, two-way transfer pipe 40 which is connected at a lower end portion thereof to a bottom drain well section 42 of the drum 14. An upper end portion of the single pipe 40 is connected to the lower ends of the elevated reclaims tanks $T_1$ and $T_2$ by a pair of branch lines 44 and 46 having respectively disposed therein motorized control valves 48 and 50 which may be selectively and automatically opened or closed in a manner subsequently described. Operably interposed in the single pipe 40, and positioned at or somewhat below the operating water level 52 of the drum 14, is a water pump 54 which, when energized, functions to pump water from within the drum 14 upwardly through the single transfer pipe 40 to a selected one of the reclaim tanks via its associated control valve.

As will be seen, a central operational theme of the reclaim system 20 is the transfer of heated rinse water from within the drum 14 to one of the reclaim tanks, and the subsequent transfer of reclaimed heated water from the tanks into the drum 14 for subsequent re-use of the reclaimed heated water.

This two-way transfer between the drum 14 and the reclaim tanks $T_1$ and $T_2$ is uniquely achieved with the single pipe 40. As a preliminary example, when it is desired to transfer heated water from within the drum 14 to the reclaim tank $T_1$, the control valve 48 is opened and the pump 54 is energized to pump water from within the drum upwardly through the single pipe 40 into the reclaim tank $T_1$. When on the other hand, it is desired to transfer reclaimed water from the tank $T_1$ to the drum 14, the valve 48 is opened and the pump 54 is de-energized so that water within tank $T_1$ flows by gravity downwardly through the single pipe 40 into the drum 14. This advantageous use of the single pipe 40 to define a two-way transfer passage significantly reduces the cost of the reclaim system 20, simplifies its operation, and enhances the overall compactness of the system.

In addition to its drain well section 42, the washing drum 14 is also provided with a variety of generally conventional operational and sensing elements which include a drain valve 56 operable to drain to waste water disposed within the drum, a temperature sensing element 58 which senses the water temperature within the drum, and a level sensor 60 which senses the water level within the drum. The drum 14 is also provided with a heated fresh water inlet line 62 which is connected to a hot water heater (not illustrated) and is provided with a suitable inlet valve 64 which is automatically opened and closed in a manner subsequently described to control the inflow of heated fresh water into the drum 14. As needed, auxiliary heat is provided to the water disposed within the drum 14 by means of a steam supply line 66 which is connected to a source of steam (not illustrated) and is provided with a suitable stream supply control valve 68.

The control and operational sequencing of the valves 48 and 50, the pump 54, and the valves 56, 62 and 68 is achieved by means of a microprocessor 70 which is operatively connected to the pump 54 by a lead 72, to the drain valve 56 by a lead 74, to the temperature sensing element 58 by a lead 76, to the level sensing element 60 by a lead 78, to the steam valve 68 by a lead 80, to the fresh water inlet valve 64 by a lead 82, and to the tank control valves 48, 50 by leads 84 and 86. In addition to controlling these previously described elements, the microprocessor 70 is also operative in a generally conventional manner to run the washing machine 10 through both a "heavy soil" wash cycle and a "light soil" wash cycle (in addition to other cycles which the particular machine may be provided with) which may be respectively selected utilizing heavy soil and light soil selector buttons 88, 90 connected to the microprocessor. The circuitry utilized to run the machine through the cycles is conventional and is accordingly not illustrated herein.

Figure 6:
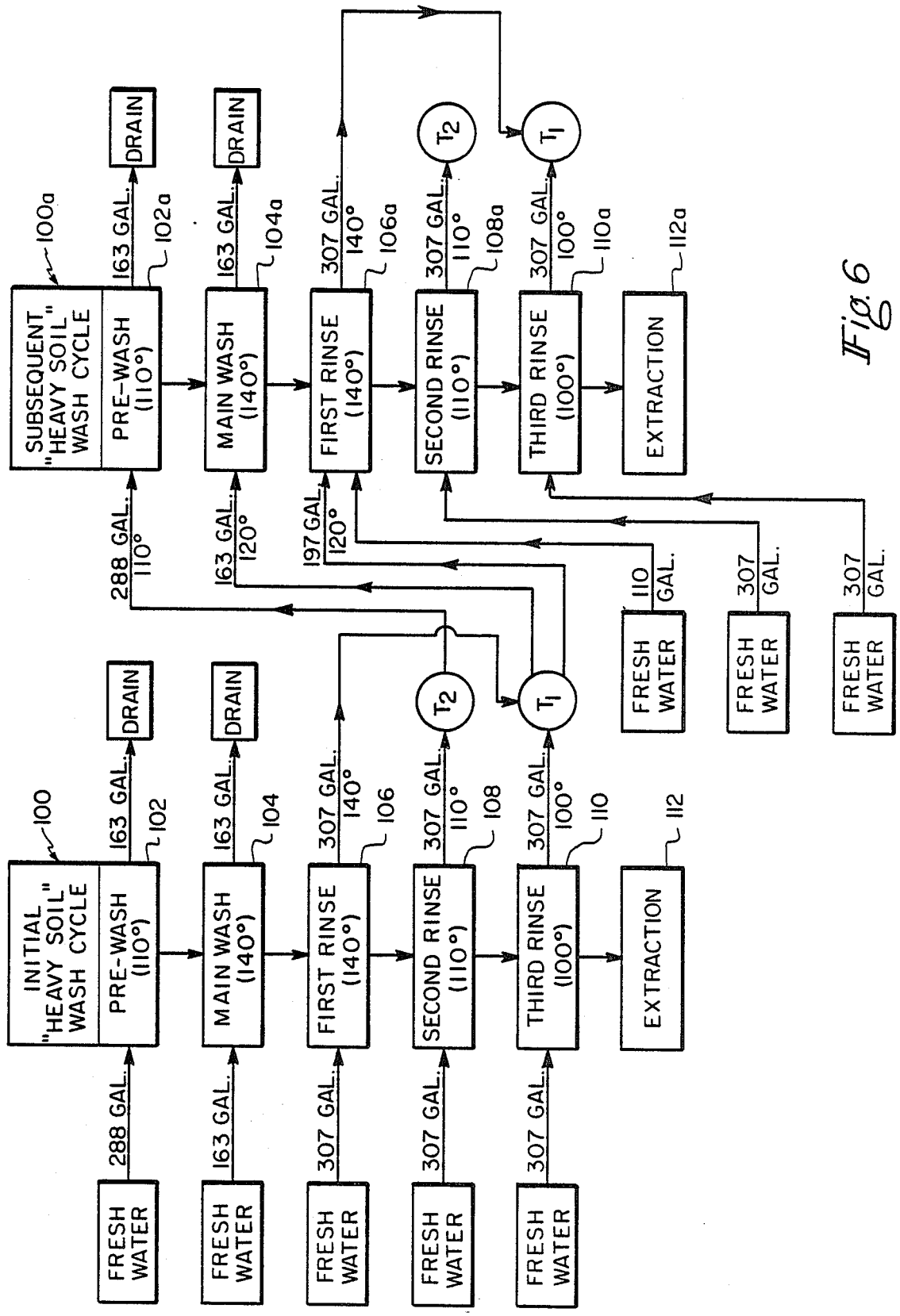
FIG. 6 is a schematic flow diagram illustrating the operation of the reclaim system during the heavy soil wash cycle of the washing machine.

The operation of the water and heat reclaim system 20 will now be described in detail with reference to FIG. 5, and to FIG. 6 which schematically depicts the various water flows into and out of the drum 14 during operation of the washing machine 10 in its "heavy soil" wash cycle. For purposes of describing the operation of the reclaim system, various actual water flows and operating temperatures will be used. However it will be readily appreciated that the unique operating principles of the reclaim system 20 are equally applicable to smaller or larger washing machines having lesser or greater water flows and different operating temperatures.

It will be initially assumed that the washing machine 10 is being used to launder a 600 pound representative load of linen. As is generally conventional in the laundry industry, it will also be assumed that during the wash portions of the particular wash cycle approximately 4 pounds of water are required for each pound of linen, and during the rinse portions of the cycle approximately 6 pounds water are required for each pound of linen being rinsed. For purposes of flow analysis, these water poundage requirements have been converted to gallons of flow.

At the start of each day's laundry operation, the integral reclaim tanks $T_1$ and $T_2$ are empty. To initially use the washing machine 10 in its heavy soil wash cycle, the selector button 88 is depressed to begin the machine's initial heavy soil wash cycle 100. The initial heavy soil wash cycle 100 of the machine 10, like each subsequent heavy soil wash cycle thereof, includes, in sequence a pre-wash portion 102 carried out at a water temperature of approximately 110°, a main wash portion 104 carried out at a water temperature of approximately 140°, a first rinse portion 106 carried out at a water temperature of approximately 140°, a second rinse portion 108 carried out at a temperature of approximately 110° a third rinse portion 110 carried out at a temperature of approximately 100°, and a final extraction portion 112 in which residual water within the washed and rinsed linens is extracted therefrom.

At the beginning of the pre-wash portion 102 of the initial wash cycle 100, the inlet valve 64 is operated to admit approximately 288 gallons of heated fresh water into the drum 14 for use in the cycle portion 102. In a conventional manner, a suitable cleaning agent is also added. At the end of the pre-wash portion 102, the drain valve 56 is opened to drain to waste approximately 163 gallons of water from the drum, the balance of the initially admitted 288 gallons of water being soaked up by and retained in the linen within the drum.

Next, the main wash portion 104 of the cycle 100 is initiated by opening the inlet valve 64 to admit approximately 163 gallons of heated fresh water into the drum for use in the main wash portion 104. A suitable cleaning agent is also added. At the end of the main wash portion, the drain valve 56 is opened to drain to waste approximately 163 gallons of water from the drum.

The first rinse portion 106 of the cycle 100 is then initiated by opening the inlet valve 64 to admit approximately 307 gallons of heated fresh water into the drum for use in the first rinse portion. At the end of the first rinse portion 106, the tank control valve 48 is opened, the pump 54 is energized, and approximately 307 gallons of heated rinse water at approximately 140° is pumped upwardly through the single pipe 40 into the reclaim tank $T_1$. Tank control valve 48 is then closed and the pump 54 de-energized.

The second rinse portion 108 of the cycle 100 is then started by opening the inlet valve 64 and admitting approximately 307 gallons of heated fresh water into the drum for use in the second rinse portion. At the end of the second rinse portion, the tank valve 50 is opened, the pump 54 is energized, and approximately 307 gallons of heated rinse water at approximately 110° is pumped upwardly through the single pipe 40 into the reclaim tank $T_2$. The tank valve 50 is then closed and the pump 54 de-energized.

At the beginning of the third rinse portion 110 of the initial heavy soil wash cycle 100, the inlet valve 64 is opened to admit approximately 307 gallons of heated fresh water into the drum for use in the third rinse portion. At the end of the rinse portion 110, the tank valve 48 is opened, and the pump 54 is energized to pump approximately 307 gallons of heated rinse water at approximately 100° from within the drum upwardly through the single pipe 40 into the reclaim tank $T_1$. Tank valve 48 is then closed and the pump 54 deenergized.

After the third rinse portion 110 has been completed, extraction portion 112 of the cycle 100 is carried out to remove residual rinse water from the linens, such residual rinse water being drained to waste via the drain valve 56.

In the illustrated embodiment of the washing machine 10 of the present invention, the water capacities of the integral reclaim tanks $T_1$ and $T_2$ are respectively 360 gallons and 307 gallons. These tanks are provided with appropriate overflow lines 114 and 116 which are routed to a suitable waste drain inlet that is typically positioned beneath the body section 12 of the machine 10 and also receives the discharge from the drum drain valve 56. As will be seen, the reclaimed rinse water disposed within the tanks $T_1$ and $T_2$ is re-used in a subsequently described manner in the pre-wash, main wash, and first rinse portions of the next subsequent heavy soil wash cycle of the machine 10. Accordingly, these reclaim tanks are sized to provide at least the minimum reclaimed water requirements for each of the subsequent cycle portions. They could, however, be sized somewhat larger if desired.

In a conventional manner, if the heated fresh water entering the drum at the beginning of a given portion of the wash cycle 100 is less than that required in such portion, as sensed by the temperature sensing element 58, the steam valve 68 is open to supply steam to the drum interior to elevate the water temperature therein to its required level. For example, if, in the main wash portion 104, the entering temperature of the heated fresh water is 110°, sufficient steam is admitted to the interior of the drum to elevate the water temperature therein to the required 140°. At the end of the initial heavy soil wash cycle 100, there is approximately 307 gallons of reclaimed rinse water at approximately 110° in the reclaim tank $T_2$. In the reclaim tank $T_1$ is 360 gallons of reclaimed rinse water at a temperature of approximately 120°, the tank $T_1$ having received approximately 307 gallons of rinse water at 140° and an additional 307 gallons of rinse water at approximately 100° (for a total of approximately 614 gallons of heated rinse water at an average temperature of approximately 120°) and has overflowed approximately 254 gallons.

Upon completion of the initial heavy soil wash cycle 100, the linen within the drum is removed and another batch of linen is placed in the drum.

The primary water and heat-saving benefits of the reclaim system 20 come into play in the next subsequent heavy soil wash cycle $100_a$ and in each such wash cycle subsequent thereto.

At the beginning of the pre-wash portion $102_a$ of the first subsequent heavy soil wash cycle $100_a$, a suitable cleaning agent is placed in the drum and the tank valve 50 is opened to admit approximately 288 gallons of reclaimed rinse water at approximately 110° into the drum from the reclaim tank $T_2$, after which the tank valve 50 is closed. Reclaimed, heated rinse water transferred to the drum from the tank $T_2$ flows by gravity downwardly through the single transfer pipe 40, through the de-energized pump 54 and into the drum via its bottom well section 42.

It is important to initially note that in the pre-wash portion $102_a$ of the subsequent wash cycle $100_a$ no heated fresh water is required to be supplied to the drum. Reclaimed rinse water flowed into the drum is at a temperature of approximately 110°—a temperature substantially equal to the 110° temperature required in this portion of the wash cycle $100_a$. Accordingly, and very importantly, no heat in any form is required to be supplied to the incoming drum water. Thus, all of the heat and all of the water required in the pre-wash portion $102_a$ is supplied from the water previously stored in the tank $T_2$. At the end of the pre-wash portion $102_a$, the drain valve 56 is opened to drain to waste approximately 163 gallons of water from the drum.

At the beginning of the main wash portion $104_a$ of the subsequent wash cycle $100_a$, the tank valve 48 is opened to flow approximately 163 gallons of reclaimed rinse water at approximately 120° downwardly through the transfer pipe 40 into the drum for use during the main wash portion of the wash cycle, and a quantity of cleaning agent is placed into the drum. Again, no heated fresh water is required for this main wash portion of the subsequent cycle $100_a$. Additionally, the incoming water is only approximately 20° below the 140° operating temperature of this main wash portion. Accordingly, only a relatively small amount of steam from the steam line 66 is required to elevate the temperature of the reclaimed rinse water entering the drum. At the end of the main wash portion $104_a$, drain valve 56 is opened to drain to waste approximately 163 gallons of water from the drum.

After its delivery of 163 gallons of rinse water through the drum, the reclaim tank $T_1$ has left therein approximately 197 gallons of reclaimed rinse water at approximately 120°. At the beginning of the first rinse portion $106_a$ of the wash cycle $100_a$, this remaining 197 gallons of reclaimed rinse water is delivered to the drum. The balance of the 307 gallons of water needed for the first rinse portion $106_a$ is delivered to the drum by appropriately opening and then closing the inlet valve 64. The reclaimed rinse water and the heated fresh water entering the drum at the beginning of the first rinse portion $106_a$ is appropriately elevated in temperature via the steam supply line 66. Again it can be seen that the reclaim system 20 has significantly reduced both the water and overall heat quantity needed in the first rinse portion $106_a$. The necessity for introducing the fresh water into the drum for the first rinse portion $106_a$ may, if desired, be eliminated by increasing the storage capacity of the tank $T_1$. At the end of the first rinse portion 106$_a$, the tank valve 48 is opened, and the pump 54 energized to pump approximately 307 gallons of heated rinse water at approximately 140° from within the drum upwardly through the transfer pipe 40 into the reclaim tank T$_1$ for use in the main wash and first rinse portions of the next subsequent wash cycle.

Next, the second rinse portion 108$_a$ of the subsequent wash cycle 100$_a$ is initiated by opening the inlet valve 64 and flowing approximately 307 gallons of heated fresh water into the drum. At the end of the second rinse portion 108$_a$ the tank valve 50 is opened, and the pump 54 is energized to pump approximately 307 gallons of heated rinse water at approximately 110° from within the drum upwardly through the transfer pipe 40 into the tank T$_2$. Tank valve 50 is then closed. The water received within the tank T$_2$ is stored therein for use in the pre-wash portion of a subsequent was cycle.

The third rinse portion 110$_a$ of the wash cycle 100$_a$ is begun by opening the inlet valve 64 to flow approximately 307 gallons of heated fresh water into the drum for use in the third rinse portion. At the end of the third rinse portion 110$_a$, tank valve 48 is opened, and the pump 54 is energized to pump approximately 307 gallons of heated rinse water at approximately 100° into the tank T$_1$. The tank valve 48 is then closed. This fills and overflows the tank T$_1$ so that it contains its full capacity of 360 gallons of reclaimed rinse water at a blended temperature of approximately 120° for reuse in the main wash and first rinse portions of the next subsequent wash cycle.

Finally, the extraction portion 112$_a$ of the wash cycle 100$_a$ is carried out to remove residual rinse water from the linens and drain to waste such residual rinse water.

Figure 7:
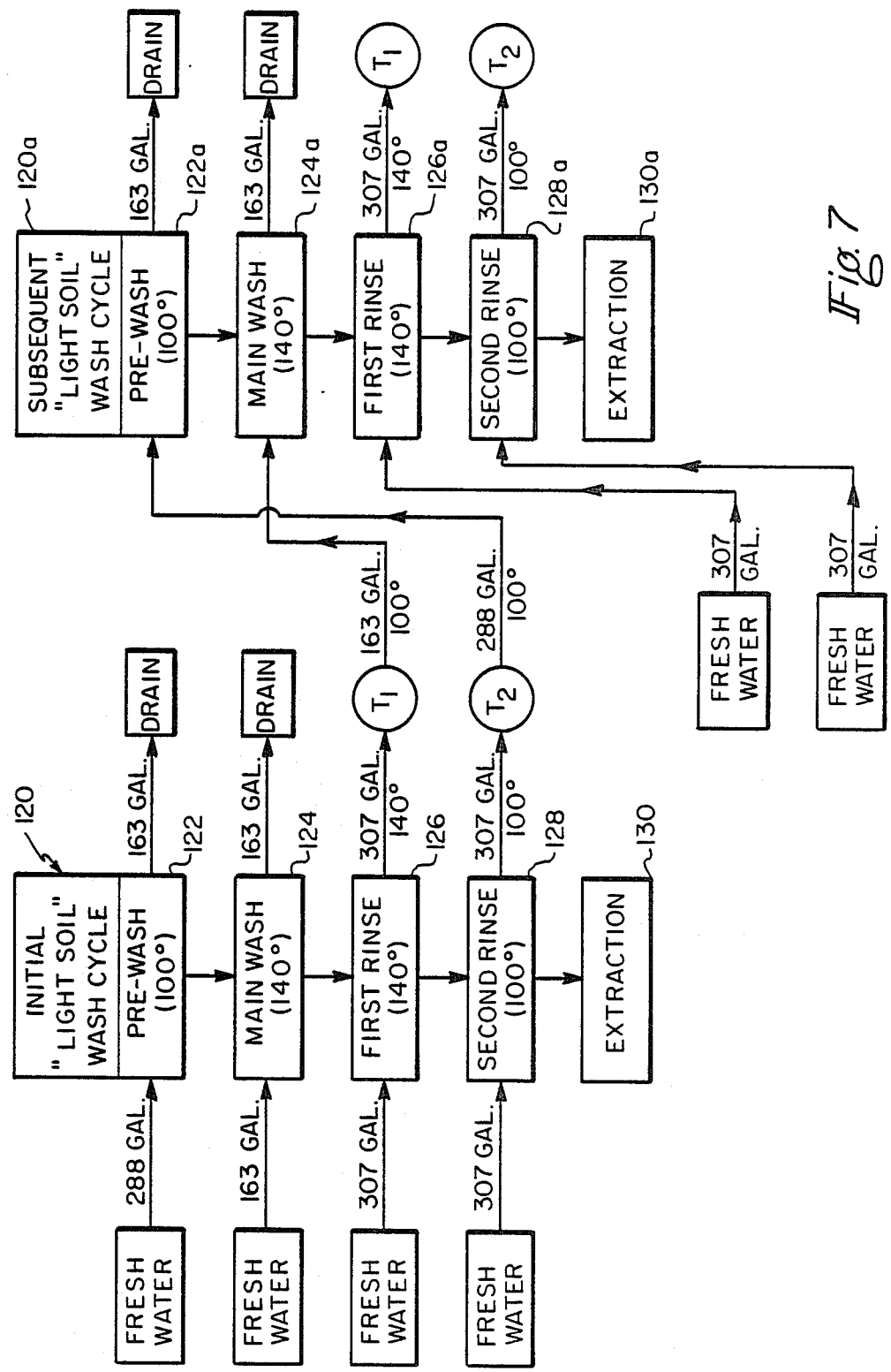
FIG. 7 is a schematic diagram illustrating the operation of the reclaim system during the light soil wash cycle of the washing machine.

The water and heat reclaim system 20 is operated in a similar manner when the "light soil" wash cycle of the washing machine 10 is selected by depressing the selector button 90. Referring now to FIG. 7, like each subsequent light soil wash cycle, the initial light soil wash cycle 120 of the machine 10 includes, in sequence, a pre-wash portion 122 carried out at a temperature of approximately 100°, a main wash portion 124 carried out at a temperature of approximately 140°, a first rinse portion 126 carried out at a temperature of approximately 140°, a second rinse portion 128 carried out at a temperature of approximately 100°, and an extraction portion 130.

At the beginning of the pre-wash portion 122, approximately 288 gallons of heated fresh water is flowed into the drum as previously described, and at the end of the pre-wash portion 122 approximately 163 gallons of water from the drum is drained to waste, also as previously described. At the beginning of the main wash portion 124 approximately 163 gallons of heated fresh water is flowed into the drum, and at the end of the main wash portion approximately 163 gallons of drum water is drained to waste. Approximately 307 gallons of heated fresh water is flowed into the drum at the beginning of the first rinse portion 126, and at the end of the first rinse portion approximately 307 gallons of heated rinse water at approximately 140° is pumped upwardly into the reclaim tank T$_1$ for retention therein as previously described. Prior to the final extraction portion 130, approximately 307 gallons of heated fresh water is flowed into the drum at the beginning of the second rinse portion 128, and at the end of such second rinse portion approximately 307 gallons of heated rinse water at approximately 100° is pumped upwardly into the reclaim tank T$_2$ for retention therein.

During the pre-wash portion 122$_a$ of the next subsequent light soil wash cycle 120$_a$, approximately 288 gallons of reclaimed rinse water at approximately 100° is flowed by gravity from the reclaim tank T$_2$ into the drum for use in the pre-wash portion 122$_a$. It can be seen in FIG. 7 that the reclaimed rinse water supplied to the drum for the pre-wash portion 122$_a$ has a temperature substantially equal to the operating temperature of the pre-wash portion 122$_a$. Accordingly, little or no auxiliary heat needs to be added to the incoming water. At the end of the pre-wash portion 122$_a$, approximately 163 gallons of water is drained to waste from the drum.

In a similar manner, at the beginning of the main wash portion 124$_a$ of the subsequent wash cycle 120$_a$, approximately 163 gallons of reclaimed rinse water at approximately 140° is gravity-flowed from the reclaim tank T$_1$ into the drum. As in the case of the pre-wash portion 122$_a$, the reclaimed rinse water entering the drum for use in the main wash portion 124$_a$ has a temperature substantially identical to the operating temperature of the main wash portion. Once again, little or no auxiliary heat needs to be supplied to this incoming reclaimed heated rinse water. At the end of the main wash portion 124$_a$ of the subsequent wash cycle 120$_a$, approximately 163 gallons of water is drained to waste from the drum.

Prior to the final extraction portion 130$a$ of the cycle 120$_a$ approximately 307 gallons of heated fresh water is flowed into the drum for use in each of the first and second rinse portions 126$_a$, 128$_a$. At the end of the first rinse portion 126$a$, approximately 307 gallons of heated rinse water at approximately 140° is pumped upwardly into the tank T$_1$ for subsequent use in the main wash portion of the next wash cycle. In a similar manner, at the end of the second rinse portion 128$_a$ approximately 307 gallons of heated rinse water at approximately 100° is pumped upwardly into the reclaim tank T$_2$ for use in the pre-wash portion of the next wash cycle.

It can be seen from the foregoing that the water and heat reclaim system 20 of the present invention is uniquely operative to provide a very substantial savings in both water usage and water heating costs. In developing the present invention, it has been found that during the operation of the improved washing machine 10 in its heavy soil cycle mode, total water usage is reduced by approximately 47%, and overall energy usage is reduced by approximately 39%, compared to "total dump" systems which simply drain to waste all of the water received for each of the cycle portions. Compared to the conventional use of a single, centrally located water reclaim tank which re-uses only the last rinse portion water, the washing machine 10 in its heavy soil cycle mode reduces total water consumption by approximately 21%, and reduces overall heating energy consumption by approximately 21%. In its light soil cycle mode, the improved washing machine provides a reduction in water usage of approximately 42%, and a heating energy usage reduction of approximately 43%, compared to the "total dump" mode of operation. Compared to the single central reclaim tank method of operation, the improved washing machine in its light soil cycle mode reduces water usage by approximately 27%, and reduces heating energy usage by approximately 30%. In addition to these very significant water and energy usage reductions, it has also been found that an approximate 10% reduction in cleaning agent usage is also achieved since there is a quantity of such agent present in the stored and re-used rinse water.

Moreover, these benefits are uniquely achieved without the necessity of utilizing additional floor space beyond that normally required by the washing machine without an integral reclaim system. Because the reclaim system is integrally incorporated within the machine, there is a considerable reduction in piping and control complexity. The simple one-pipe water transfer mechanism described above results in reduced installation costs and also affords the washing machine the ability to use the normal machine drain trough which is typically built into the floor beneath the machine to receive water discharged from its drum drain valve. Because of this feature, there is simply no need to build an additional drain system as in the case where a single central reclaim tank is utilized in conjunction with a series of washing machines.

The improved washing machine apparatus of the present invention, via its integral reclaim system, also uniquely provides a dual temperature rinse water supply system which supplies separate flows of reclaimed, heated rinse water that closely match the different water operating temperatures required in the two wash portions of the machine wash cycles. This very beneficial temperature "matching" feature of the present invention simply cannot be duplicated in a conventional single central tank reclaim system.

The foregoing detailed description is to be clearly understood as given by way of illustration and example only, the spirit and scope of the present invention being limited solely by the appended claims.

What is claimed is:

1. Water and heat-saving washing machine apparatus having a wash cycle with sequential pre-wash, main wash, first rinse and second rinse portions, said apparatus comprising:
   (a) a main body section;
   (b) first and second water reclaim tanks carried by said main body section in an elevated position and adapted to hold quantities of heated rinse water;
   (c) a drum carried by said main body section below said first and second water reclaim tanks and adapted to receive water, a cleaning agent and launderable items, said drum being operable to wash and rinse the launderable items;
   (d) first means for flowing heated rinse water from said second water reclaim tank into said drum for use in said pre-wash portion of said wash cycle and then draining to waste water within said drum at the end of said prewash portion of said wash cycle;
   (e) second means for flowing heated rinse water from said first water reclaim tank into said drum for use in said main wash portion of said wash cycle and then draining to waste water disposed within said drum at the end of said main wash portion of said wash cycle;
   (f) third means for flowing heated fresh water into said drum for use in said first rinse portion of said wash cycle and then flowing rinse water from within said drum into said first water reclaim tank at the end of said first rinse portion of said wash cycle; and
   (g) fourth means for flowing heated fresh water into said drum for use in said second rinse portion of said wash cycle and then flowing rinse water from within said drum into said second water reclaim tank at the end of said second rinse portion of said wash cycle.

2. The washing machine apparatus of claim 1 wherein said wash cycle additionally includes a third rinse portion, and said washing machine apparatus further comprises:
   means for flowing heated rinse water from said first water reclaim tank into said drum for use in said first rinse portion of said wash cycle, and
   means for flowing heated fresh water into said drum for use in said third rinse portion of said wash cycle and then flowing rinse water from within said drum into said first water reclaim tank at the end of said third rinse portion of said wash cycle.

3. The washing machine apparatus of claim 1 further comprising:
   means for selectively supplying auxiliary heat to water disposed within said drum.

4. A water and heat-saving method of operating a washing machine having a drum adapted to receive heated water, a cleaning agent and launderable items and being operable to wash and rinse such items, said washing machine further having a wash cycle including, in sequence, a pre-wash portion, a main wash portion, a first rinse portion and a second rinse portion, said method comprising the steps of:
   (a) providing first and second water reclaim receptacles each adapted to hold a quantity of heated water;
   (b) flowing heated water from said second receptacle into said drum for use in said pre-wash portion of said wash cycle and then draining to waste water disposed within said drum at the end of said pre-wash portion of said wash cycle;
   (c) flowing heated water from said first receptacle into said drum for use in said main wash portion of said wash cycle and then draining to waste water disposed within said drum at the end of said main wash portion of said wash cycle;
   (d) providing within said drum a quantity of heated fresh water for use in said first rinse portion of said wash cycle and then flowing water from within said drum into said first receptacle at the end of said first rinse portion of said wash cycle; and
   (e) providing within said drum a quantity of heated fresh water for use in said second rinse portion of said wash cycle and then flowing water from within said drum into said second receptacle at the end of said second rinse portion of said wash cycle.

5. The method of claim 4 wherein said wash cycle further has a third rinse portion, and wherein said method further comprises the steps of:
   flowing heated water from said first water reclaim receptacle into said drum for use in said first rinse portion of said wash cycle, and
   providing within said drum a quantity of heated fresh water for use in said third rinse portion of said wash cycle, and then flowing heated water from said drum into said first water reclaim receptacle at the end of said third rinse portion of said wash cycle.

6. The method of claim 4 wherein said washing machine has a body section adapted to rest upon a support surface, and said drum is carried by said body section, and wherein said method further comprises the step of:
   supporting said first and second water reclaim receptacles on said body section above said drum.

7. The method of claim 6 further comprising the step of:
  interconnecting single, two-way transfer pipe means between said drum and said first and second water reclaim receptacles, and
  wherein said flowing steps are performed by intermittently flowing water in opposite directions through said single, two-way transfer pipe means during said wash cycle.

8. Improved washing machine apparatus having a wash cycle including, in sequence, a pre-wash portion, a main wash portion, a first rinse portion, and a second rinse portion, said improved washing machine apparatus comprising:
  (a) drum means for receiving water, a cleaning agent and launderable items, and being operable during said wash cycle to clean and rinse the launderable items;
  (b) supply means selectively operable to supply heated fresh water to said drum means;
  (c) heating means for heating water supplied to said drum means for use in said portions of said wash cycle to predetermined temperatures;
  (d) drain means selectively operable to drain to waste water disposed within said drum means;
  (e) a first water reclaim tank;
  (f) a second water reclaim tank;
  (g) transfer means selectively operable to flow water from within said drum means to a selected one of said first and second water reclaim tanks or to flow water from a selected one of said first and second water reclaim tanks to said drum means; and
  (h) control means operative to initiate and terminate said portions of said wash cycle and to sequentially:
    (1) operate said transfer means to flow water from said second water reclaim tank into said drum means for use in said pre-wash portion of said wash cycle and then operate said drain means at the end of said pre-wash portion of said wash cycle;
    (2) operate said transfer means to flow water from said first water reclaim tank into said drum means for use in said main wash portion of said wash cycle and then operate said drain means at the end of said main wash portion of said wash cycle;
    (3) operate said supply means to supply heated fresh water to said drum means for use in said first rinse portion of said wash cycle and then operate said transfer means to flow water from said drum means to said first water reclaim tank at the end of said first rinse portion of said wash cycle; and
    (4) operate said supply means to supply heated fresh water to said drum means for use in said second rinse portion of said wash cycle and then operate said transfer means to flow water from said drum means to said second water reclaim tank at the end of said second rinse portion of said wash cycle.

9. The improved washing machine apparatus of claim 8 wherein:
  said wash cycle further includes a third rinse portion, and
  said control means are further operative to sequentially:
    operate said transfer means to flow water from said first water reclaim tank into said drum means for use in said first rinse portion of said wash cycle, and
    operate said supply means to supply heated fresh water to said drum means for use in said third rinse portion of said wash cycle and then operate said transfer means to flow water from said drum means into said first water reclaim tank at the end of said third rinse portion of said wash cycle.

10. The improved washing machine apparatus of claim 8 wherein:
  said washing machine apparatus includes a body section adapted to rest upon a supporting surface,
  said drum means are carried by said body section, and
  said first and second water reclaim tanks are supported on said body section above said drum means.

11. The improved washing machine apparatus of claim 10 wherein:
  said transfer means include single, two-way pipe means interconnected between said drum means and said first and second water reclaim tanks, pump means operatively connected in said pipe means, and valve means selectively operable to communicate the interiors of said first and second water reclaim tanks with the interior of said pipe means, and
  said control means are operatively interconnected with said pump means and said valve means.

12. The improved washing machine apparatus of claim 11 wherein:
  said control means include a microprocessor.

13. The improved washing machine apparatus of claim 8 wherein:
  said heating means include means for selectively injecting steam into said drum means.

14. Water and heat-saving washing machine apparatus having a wash cycle with sequential pre-wash, main wash, first rinse and second rinse portions, said apparatus comprising:
  (a) a main body section adapted to rest upon a supporting surface;
  (b) a first water reclaim tank carried by said main body section in an elevated position and adapted to hold a quantity of heated rinse water;
  (c) a second water reclaim tank carried by said main body section in an elevated position and adapted to hold a quantity of heated rinse water;
  (d) a drum carried by said main body section below said first and second water reclaim tanks and adapted to receive heated water, a cleaning agent and launderable items, said drum being operable to wash and rinse the launderable items;
  (e) a single pipe connected to said drum and having first and second branch portions having outer ends respectively communicating with the interiors of said first and second water reclaim tanks;
  (f) first and second control valves respectively interposed in said first and second branch portions of said single pipe;
  (g) a pump interposed in said single pipe between said drum and said first and second branch portions and being operable to pump water from said drum upwardly through said single pipe into a selected one of said first and second water reclaim tanks and, when de-energized, adapted to permit a flow of heated rinse water from a selected one of said first and second water reclaim tanks downwardly through said single pipe and into said drum;

(h) drain means for selectively draining to waste water disposed within said drum;

(i) supply means selectively operable to flow heated fresh water into said drum; and (j) control means for controlling the operation of said first and second control valves, said pump, said drain means and said supply means to sequentially:

(1) flow heated rinse water from said second water reclaim tank downwardly through said single pipe, and into said drum, for use in said prewash portion of said wash cycle and then drain to waste water disposed within said drum at the end of said pre-wash portion of said wash cycle;

(2) flow heated rinse water from said first water reclaim tank downwardly through said single pipe, and into said drum, for use in said main wash portion of said wash cycle and then drain to waste water disposed within said drum at the end of said main wash portion of said wash cycle;

(3) flow heated fresh water into said drum for use in said first rinse portion of said wash cycle and then pump water from within said drum upwardly through said single pipe into said first water reclaim tank through said first control valve at the end of said first rinse portion of said wash cycle, and (4) flow heated fresh water into said drum for use in said second rinse portion of said wash cycle and then pump water from within said drum upwardly through said single pipe and into said second water reclaim tank through said second control valve at the end of said second rinse portion of said wash cycle.

15. The washing machine apparatus of claim 14 wherein said wash cycle additionally has a third rinse portion, and wherein said control means are further operative to:

flow heated rinse water from said first water reclaim tank downwardly through said single pipe, and into said drum, for use in said first rinse portion of said wash cycle, and flow heated fresh water into said drum for use in said third rinse portion of said wash cycle and then pump water from within said drum upwardly through said single pipe into said first water reclaim tank through said first control valve at the end of said third rinse portion of said wash cycle.

16. A method of operating a washing machine having a washing drum and a wash cycle including, in sequence, pre-wash, main wash, first rinse and second rinse portions, said method comprising the steps of:

providing first and second water reclaim receptacles;

flowing heated rinse water at a first temperature from said drum into said first water reclaim receptacle at the end of the first rinse portion of a first wash cycle of said washing machine;

flowing heated rinse water at a second temperature from said drum into said second water reclaim receptacle at the end of the second rinse portion of said first wash cycle of said washing machine;

flowing heated rinse water from said second water reclaim receptacle into said drum for use in the pre-wash portion of a subsequent wash cycle of said washing machine; and flowing heated rinse water from said first water reclaim receptacle into said drum for use in the main wash portion of a subsequent wash cycle of said washing machine.

17. The method of claim 16 wherein:

said providing step includes supporting said first and second water reclaim receptacles on said washing machine above said drum.

18. The method of claim 17 wherein:

said flowing steps are performed by providing single, two-way transfer pipe means interconnected between said drum and said first and second water reclaim receptacles and having a pump operatively installed therein, and selectively causing heated rinse water to flow in opposite directions through said transfer means.

* * * * *